United States Patent [19]

Sucheck

[11] 4,110,911
[45] Sep. 5, 1978

[54] SHINGLE GAGE

[76] Inventor: Robert J. Sucheck, 319 Colonial Dr., Monroe, Mich. 48161

[21] Appl. No.: 792,938

[22] Filed: May 2, 1977

[51] Int. Cl.² .............................................. G01B 5/16
[52] U.S. Cl. .................................... 33/188; 33/107 R
[58] Field of Search ...................... 33/188, 187, 107 R

[56] References Cited

U.S. PATENT DOCUMENTS

| 378,548 | 2/1888 | Hotchkiss | 33/187 |
| 476,257 | 6/1892 | Finmand | 33/187 |
| 1,343,968 | 6/1920 | Hahn | 33/107 R |
| 1,405,760 | 2/1922 | Collins | 33/188 |
| 1,750,854 | 3/1930 | Nelson | 33/188 |
| 2,243,468 | 5/1941 | Johnson | 33/188 |
| 2,887,781 | 5/1959 | Mills | 33/188 |

Primary Examiner—William D. Martin, Jr.
Attorney, Agent, or Firm—Gifford, Chandler, VanOphem, Sheridan & Sprinkle

[57] ABSTRACT

A shingle gage is provided for aligning a second row of shingles to a first, lower row of shingles fixed to a roof or like structure so that the shingle rows are parallel to and spaced from each other. The shingle gage includes a first member having a first alignment surface which abuts against one longitudinal edge of the fixed row of shingles. A second member is attached to the first member of the shingle gage and includes a second alignment surface adapted to abut against one longitudinal edge of the second row of shingles. The first and second alignment surfaces are parallel to each other so that, with an abutting engagement obtained between the respective alignment surfaces and the first and second row of shingles, the second shingle row is aligned parallel to the first row of shingles and then secured to the roof. In addition, the second member is adjustably attached to the first member so that the spacing between the alignment surfaces is adjustable.

2 Claims, 3 Drawing Figures

SHINGLE GAGE

BACKGROUND OF THE INVENTION

1. Field of the Invention

The present invention relates to a shingle gage for aligning two rows of shingles parallel to each other.

2. Description of the Prior Art

Shingles, of the type attached to the roof of building constructions, typically are manufactured and commercially available in elongated strips. A first strip or row of shingles is typically secured to the lower edge of the roof and thereafter a second strip or row of shingles is secured to the roof so that the second row overlaps a portion of the first row. This process is repeated until the roof is covered with shingles.

Installing shingles, however, is a difficult job for several reasons. First, the shingle rows must be parallel to each other when installed. While professional shinglers can obtain the desired parallelism between the rows of shingles, many home or nonprofessional installers attempt to align the rows of shingles by sight which is difficult, if not altogether impossible, to accomplish. As a result, many home installers improperly align the shingle rows which results in roof leaks, wasted shingles, and an unsightly appearance for the completed job.

A still further problem encountered by home workmen when installing shingles is the difficulty of obtaining the same amount or degree of shingle overlap for each row of shingles. Inexperienced home installers rarely are able to obtain the same amount of overlap between the adjacent shingle rows so that, when completed, the completed roof with the uneven shingle rows exhibits an unsightly appearance.

A still further difficulty in installing shingles and one particularly encountered by experienced home installers is in the determining the correct amount of overlap of the adjacent shingle rows so that the uppermost row of shingles is even with the peak of the roof. When the improper overlap of shingles between the adjacent rows is used during the installation of the shingles, the final or upper row of the shingles is uneven with the peak of the roof and must be trimmed with a knife, scissors, or the like which is time consuming. However, even when trimmed, an unsightly appearance and even roof leaks can result.

SUMMARY OF THE PRESENT INVENTION

The present invention solves the above-mentioned difficulties in installing shingles by providing a shingle gage operable to simply and rapidly align adjacent rows of shingles parallel with each other.

In brief, the shingle gage according to the present invention comprises a first member having a first alignment surface adapted to flatly abut against one longitudinal edge of a fixed row of shingles. A second member is attached to the first member and includes a second alignment surface adapted to abut against one longitudinal edge of the row of shingles being installed. The first and second alignment surfaces are parallel to, but spaced from each other so that the shingle row being installed is parallel to the already installed or fixed shingle row.

The first and second members of the shingle gage are adjustably attached to each other so that the spacing between the shingle rows can be simply and rapidly adjusted while retaining parallelism between the alignment surfaces. Suitable indicia on the shingle gage provides a visible indication of the spacing between the first and second alignment surfaces which, when initially preset, properly spaces the adjacent shingle rows so that the final or upper row of shingles is even with the peak of the roof.

As will become more apparent as the description proceeds, the shingle gage according to the present invention is inexpensive in construction, simple in use and, therefore, particularly suited for the nonprofessional shingle installer.

BRIEF DESCRIPTION OF THE DRAWING

The shingle gage according to the present invention will be more clearly understood upon reference to the following detailed description when read in conjunction with the accompanying drawing, wherein like reference characters refer to like parts throughout the several views, and in which.

DETAILED DESCRIPTION OF THE PRESENT INVENTION

Figure 2:
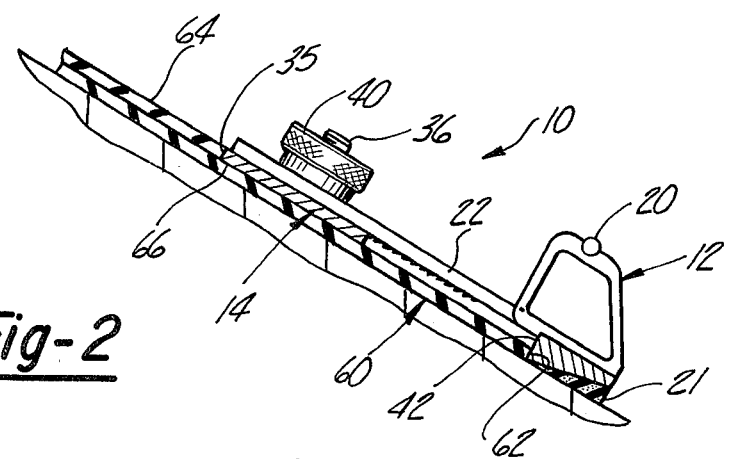
FIG. 2 is a fragmentary sectional view of the shingle gage of the present invention taken substantially along line 2—2 in FIG. 1 and enlarged for clarity.
Figure 3:
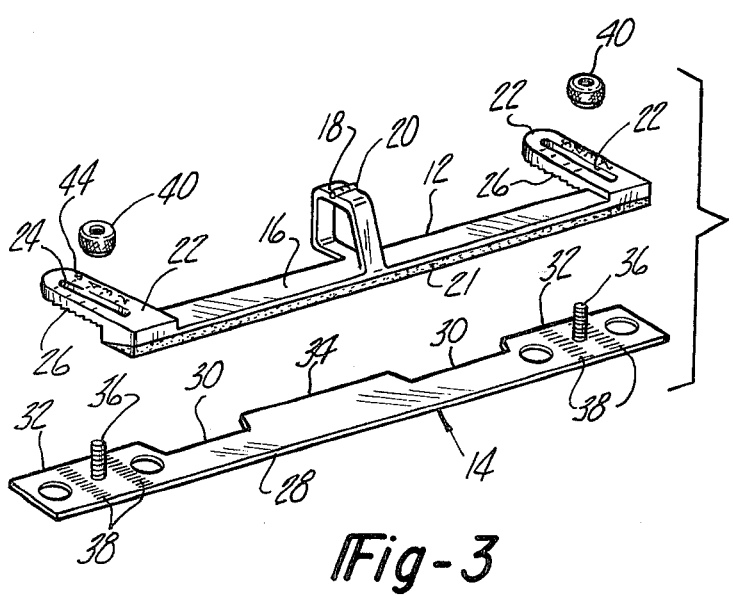
FIG. 3 is an exploded perspective view illustrating the shingle gage of the present invention.

With reference first to FIGS. 2 and 3, the shingle gage 10 according to the present invention is thereshown and comprises a first member 12 and a second member 14. The first member 12 further includes an elongated flat bar 16 with a substantially centrally disposed handle 18 secured to its upper side. A bubble level 20 is preferably provided on the top side of the handle 18. In addition, a layer 21 of soft, resilient material, such as crape or gum rubber, is attached to the bottom side of the bar 16 substantially along the entire longitudinal length of the bar 16 for a reason to be later described.

A short arm 22 is secured to, and preferably integral with, each end of the bar 16. Each arm 22 is substantially perpendicular to the bar 16 and raised somewhat above the plane of the bottom of the bar 16 (FIG. 2). A longitudinally elongated slot 24 is formed through each of the arms 22 and, in addition, the bottom surface of each arm 22 is beveled as shown at 26 for a reason to become shortly apparent.

The second member 14 is generally in the form of an elongated and flat bar 28 with a pair of spaced recesses 30 cut from one side of the bar 28. The side edges 32 on the two ends of the bar 28 register with each other and with a central side edge 34 disposed between the two recesses 30. The edges 32 and 34 together form a linear alignment surface 35.

A threaded member or stud 36 is secured to each end of the bar 28 and extends perpendicularly upwardly from the bar 28. A lateral beveled or serrated seat 28 is formed on the bar 28 on each side of each stud 36.

The first and second members 12 and 14 are secured together by positioning one stud 36 through each of the elongated slots 22 in the two arms 22 on the first member 12. With the first member 12 positioned on top of the second member 14, the beveled portions 26 on the first member arms 22 register with the serrated or beveled seat 38 formed on the second member 14 adjacent the studs 36. The lateral position of the first member 12, however, can be adjusted relative to the second member 14 by adjusting the longitudinal position of the studs 36 in the slots 24. When the members 12 and 14 are adjusted as desired, a nut 40 threadably engages stud 36 so that upon tightening of the nut 40, the first member 12 is rigidly locked to the second member 14 due to the meshing engagement between the beveled portions 26 and their seats 38.

With reference now particularly to FIG. 2, with the first member 12 secured to the second member 14 in the manner previously described, the front edge of the first member bar 16 forms a linear alignment surface 42 which is parallel to, but spaced from, the alignment surface 35 on the second member 14. Suitable indicia 44 (FIG. 3) is preferably provided on each arm 22 to indicate both the lateral spacing between the alignment surfaces 35 and 42 and also that the surfaces 35 and 42 are parallel.

Figure 1:
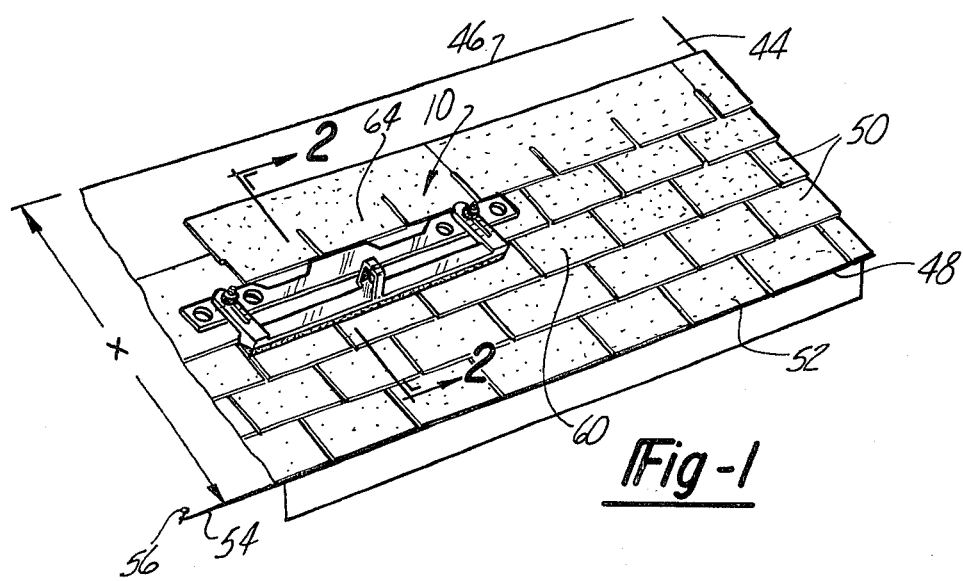
FIG. 1 is a fragmentary perspective view showing the shingle gage according to the present invention during the installation of shingles on a roof.

The operation of the shingle gage 10 of the present invention can best be described with reference to FIGS. 1 and 2. In FIGS. 1 and 2, a roof 44 is thereshown having a peak 46 and a lower edge 48. The distance "X" between the peak 46 and lower edge 48 of the roof 44 is first measured from which both the number of shingle rows 50 can be determined in addition to the necessary overlap of the shingle rows 50 required so that the last (top) row of shingles is even with the roof peak 46.

The lowermost row 52 of shingles is first installed on the roof 44 by securing a string 54 along the lower edge 48 of the roof 44 and aligning the lowermost row 52 with the string 54. The string 54 can be secured in any appropriate fashion, such as by nails 56, to the roof 44.

With the proper amount of shingle overlap having been determined, the lateral spacing between the alignment surfaces 35 and 42 on the first and second members 12 and 14 is adjusted and locked into position by means of the nuts 40. The shingle gage 10 is then placed on the lowermost installed row 60 of shingles so that the first alignment surface 42 flatly abuts against the lower longitudinal edge 62 of the lowermost installed row 60 of shingles 50. The gum rubber layer 21 on the bottom of the first member 16 will adhere to the roof or shingles and prevent movement of the shingle gage 10 once positioned.

With the shingle gage 10 thus positioned, the row of shingles being installed 64 is then placed on the roof so that the lowermost longitudinal edge 66 of the shingle row 64 abuts against the second alignment surface 35 and the shingle is then attached to the roof 44 in the conventional fashion. Once attached, the shingle gage 10 is moved laterally to install the next shingle 50 until the shingle row 64 being installed is completed. The installed row 64 then forms the guide or lowermost installed shingle row for the next adjacent or upper row of shingles and this process is continued until the roof 44 is entirely shingled.

Since the alignment surfaces 35 and 42 are parallel with each other, the identical and parallel spacing between the adjacent shingle rows 50 on the roof 44 can be accurately and consistently obtained. Moreover, due to the adjustability of the lateral distance between the alignment surfaces 35 and 42, the desired shingle spacing or overlap can be obtained on any roof 44 despite the width "X" of the roof 44.

It should by now be apparent that the shingle gage 10 of the present invention is not only simple and inexpensive in construction, but also simple to use and operate. The shingle gage 10 of the present invention thus provides a simple means by which a nonprofessional shingler can easily and rapidly shingle a roof 44 and obtain a professional looking completed job.

Having described my invention, many modifications thereto will become apparent to those skilled in the art to which it pertains without deviating from the spirit of the invention as defined by the scope of the appended claims.

I claim:

1. A shingle gage for aligning a second row of shingles to a first row of shingles, said shingle gage comprising:

a first elongated member having a first alignment surface adapted to abut against one edge of the first row of shingles;

a pair of arms, said arms being secured to opposite longitudinal ends of the first member and generally perpendicular thereto, each arm having a longitudinal slot formed therethrough;

a second elongated member, said second member having a second alignment surface adapted to abut against one edge of the second row of shingles, said second member having a threaded stud extending upwardly from each end;

said arms of said first member being positioned over the second member so that the studs extend through the slots in the arms;

nut means for threadably engaging said studs and locking said members together so that said members are substantially parallel but spaced from each other and so that said alignment ourfaces are substantially parallel to each other; and a layer of soft resilient material secured to the underside of said first member for frictionally engaging and retaining said gage to the roof surface.

2. The invention as defined in claim 1 and including a beveled portion on each arm which abuttingly registers with a seat formed on said other member when said members are secured together.

* * * * *